United States Patent [19]

Jacobine et al.

[11] Patent Number: 4,622,348

[45] Date of Patent: Nov. 11, 1986

[54] CHLOROSULFONYL ISOCYANATE DERIVATIVES AS ANAEROBIC ACCELERATORS

[75] Inventors: Anthony F. Jacobine, Meriden; David M. Glaser, New Britain, both of Conn.

[73] Assignee: Loctite Corporation, Newington, Conn.

[21] Appl. No.: 675,387

[22] Filed: Nov. 27, 1984

[51] Int. Cl.[4] .......................... C08F 4/00; C08F 20/10
[52] U.S. Cl. ........................................ 522/27; 522/14;
 522/182; 522/904; 526/194; 526/201; 526/217;
 526/279; 526/285; 526/287; 526/323.1;
 526/323.2
[58] Field of Search ............... 526/194, 201, 217, 279,
 526/285, 287, 323.1, 323.2; 204/159.15, 159.24;
 522/14, 27, 182, 904

[56] References Cited

U.S. PATENT DOCUMENTS

| | | | |
|---|---|---|---|
| 3,046,262 | 7/1962 | Krieble . | |
| 3,682,875 | 8/1972 | O'Sullivan et al. | 526/217 |
| 3,814,156 | 6/1974 | Bachmann et al. | 260/29.6 |
| 3,855,040 | 12/1974 | Malofsky | 156/310 |
| 4,215,209 | 7/1980 | Ray-Chaudhuri | 526/323.2 |
| 4,235,986 | 11/1980 | Catena | 526/323.2 |
| 4,374,940 | 2/1983 | Bhatia | 526/217 |
| 4,429,063 | 1/1984 | Reich | 523/176 |
| 4,443,587 | 4/1984 | Schmidt et al. | 526/146 |
| 4,447,588 | 5/1984 | Rametta | 526/301 |
| 4,500,675 | 2/1985 | Fisk | 524/672 |
| 4,513,127 | 4/1985 | Jacobine | 526/194 |

OTHER PUBLICATIONS

King, "Some Reactions of p-Toluene Sulfonyl Isocyanate," J. Org. Chem, 25 352 (1960).
Ulrich, "The Chemistry of Sulfonyl Isocyanates", Chem. Rev. 64 369(1964).
Szabo, "Chlorosulfonyl Isocyanate", Aldrichimica Acta 10, 23-29 (1977).

*Primary Examiner*—Harry Wong, Jr.
*Attorney, Agent, or Firm*—Walter J. Steinkraus; Eugene F. Miller

[57] ABSTRACT

Products formed from chlorosulfonyl isocyanate either by sequentially reaction of a hydroxy functional compound followed by reaction of the sulfonyl chloride group with a primary or secondary amine, or by reaction of chlorosulfonyl isocyanate with an excess of primary or secondary amine, are cure accelerators for acrylic compositions. Depending on the choice of alcohol or amine, the accelerator may be functionalized so that it is bound or bindable to an organic or silicone polymer backbone or contains other desirable functionality such as peroxy, photosensitizer, or acrylic groups.

21 Claims, No Drawings

CHLOROSULFONYL ISOCYANATE DERIVATIVES AS ANAEROBIC ACCELERATORS

BACKGROUND OF THE INVENTION

It has been known since Vernon K. Krieble's patent, U.S. Pat. No. 3,046,262, to use saccharin (benzoic sulfimide) as an accelerator of anaerobically curing acrylic compositions. The same reference, and many since, teach that sulfimides generally are useful as accelerators. Sulfimides are compounds having a divalent group of the structure:

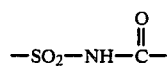

where both the sulfonyl and the carbonyl groups are linked to hydrocarbon groups.

In U.S. Pat. No. 4,447,588 there are described anaerobically curing compositions free of peroxides which include sulfimide accelerator compounds. Saccharin and $C_6H_5-SO_2NH-CO-C_6H_5$ are described as suitable sulfimide accelerators in these systems.

Sulfimides, such as saccharin, have certain limitations in anaerobic systems which it is desirable to overcome. Sulfimides typically have only limited solubility in organic resin systems and this solubility problem is worse for silicones. Saccharin is virtually insoluble in polyorganosiloxane resins. This solubility problem has severely limited extension of anaerobic curing technology, for instance in the area of anaerobically curing silicone formulations. Saccharin has also been identified as a weak carcinogen in laboratory animals, a fact which has led to a recent proposal to require cancer warning labels on all products containing saccharin. Further, the environmental mobility of small molecules generally makes it desirable that all components in curable systems be chemically bound to polymer backbones, at least in the fully cured resin. Because of these factors there is a need for new types of anaerobic accelerators which can be designed according to the solubility, acceleration efficiency, environmental mobility and other requirements of a particular formulation.

In U.S. Pat. No. 4,443,587 there are described malonylsulfamide compounds having the structure:

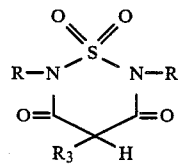

These compounds are reported to be useful as accelerators of peroxide initiated polymerizations of ethylenically unsaturated compounds such as (meth)-acrylic ethers.

In U.S. Pat. No. 4,429,063, there are described anaerobically curing acrylic monomer compositions containing open chain symmetric sulfamides containing the central group:

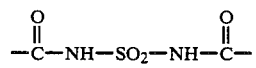

These compounds are prepared by reaction of sulfonyl diisocyanate with an alcohol or a carboxylic acid. They are reported to be useful as stabilizers of anaerobic polymerizations.

In the copending application of A. Jacobine, Ser. No. 650,750, filed Sept. 13, 1984, now U.S. Pat. No. 4,513,127, there are described anaerobic compositions which include as accelerators derivatives of aromatic sulfonyl isocyanates and compounds containing reactive hydrogen groups. The reactive hydrogen containing compound may, for instance, be a hydroperoxide, an acrylic functional compound such as hydroxyethylmethacrylate, a silicone bindable compound such as propargyl alcohol or other aliphatically unsaturated alcohols or 3-mercaptopropyltrimethoxysilane, etc.

SUMMARY OF THE INVENTION

Novel-free radical curable compositions, particularly anaerobic compositions may be prepared by using as accelerators reaction products of chlorosulfonylisocyanate first with a compound selected from a primary or secondary amine, or a hydroxy functional compound, such as an alcohol or hydroperoxide, and second, if the first compound is not an amine, with a primary or secondary amine. The reaction products may be represented by the formula:

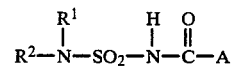

where A is $OR^3, OOR^3$ or $NR^1R^2$; $R^1$ is H or an organo group; and $R^2$ and $R^3$ are the same or different organo groups. Most suitably, A is $OR^3$, $R^1$ is H or alkyl and $R^2$ and $R^3$ are different groups which include functionalities selected from polymer backbones, radically polymerizable ethylenic unsaturation, polymer bindable functionality or photoinitiator functionality.

The curable compositions of the invention comprise a compound with acrylate or methacrylate groups, the accelerator compound defined above, and a compound which is a source of free radicals for cure initiation and which may be the same or different from the accelerator compound.

The present invention pertains to such novel compositions and to novel accelerators prepared as described above from chlorosulfonyl isocyanate. The inventive accelerators and compositions have expanded versatility over those of U.S. Pat. No. 4,513,127, because of the ability to add desired and different functionality to both sides of the chlorosulfonyl isocyanate molecule.

DETAILED DESCRIPTION OF THE INVENTION

Chlorosulfonyl isocyanate is known to react with active hydrogen containing compounds at both the isocyanate and the sulfonyl chloride functionalities. With amines, this reactivity is nonspecific and therefore any useful products must be the reaction product of the same amine with both functionalities. However, with hydroxyl containing compounds the isocyanate group reacts first and cleanly at temperatures below about 0° C. so that a sequential reaction of a stochiometric amount of a hydroxy containing compound with the isocyanate, followed by reaction of an amine with the chlorosulfonyl group, allows formation of compounds of formula I where A and $R^1$ or $R^2$ contain different desired functionalities.

The particular advantage of the chlorosulfonyl isocyanate derivatives in anaerobic fomrulations is that the central —SO$_2$NHCO— group displays anaerobic acceleration activity similar to sulfimides while the ability to modify the end groups allows incorporation of multiple useful functionalities into a single molecule depending on the needs of the formulation.

Particularly useful functionalities are groups which provide compatibility of the accelerator in the uncured formulation, groups reactive with a polymer backbone, groups co-curable with anaerobic monomers and peroxy or photosensitive groups for cure initiation.

The hydroxy functional compound may be either an alcohol or a hydroperoxide. Suitable alcohols include hydroxyl functional photoinitiators such as benzoin, 1-benzoylcyclohexanol 1-(4-dodecylphenyl)-2-hydroxy-2-methylpropan-1-one or α-hydroxy isobutyrophenone; alkyl hydroxy functional polymers such as silicones with 3-hydroxypropyl or 3-hydroxypropenyl groups, copolymers of hydroxypropyl (meth)acrylate or hydroxyethyl (meth)acrylate, and polyglycol ethers; hydroxyalkyl functional silane or acrylic monomers such as hydroxypropyldichloro(meth)ylsilane, hydroxyethyl (meth)acrylate and hydroxypropyl (meth)acrylate; and alcohols with aliphatic or alicyclic unsaturation such as allyl alcohol, propargyl alcohol, undecenyl alcohol, or norbornenyl alcohol.

Examples of suitable hydroperoxides are cumene hydroperoxide and t-butyl hydroperoxide.

Examples of suitable amines are aromatic amines such as aniline and n-alkyl anilines; amines with long chain aliphatic hydrocarbon groups; polyamines such as hexamethylene diamine, ethylene diamine, diethylene triamine, triethylene tetraamine, the reaction products of polyisocyanates or polyepoxides with excess polyamine, etc. Particularly desirable are amines with acrylic polymerizable functionality such as N-t-butylaminoethylmethacrylate and silanes or organosiloxanes with aliphatic amino functionality such as 3-aminopropyltrimethoxysilane.

In the preparation of the chlorosulfonyl isocyanate adducts it is especially preferred that one of the components be either polymer bound or contain groups that allow the adduct to subsequently be incorporated into a polymer. For example, propargyl alcohol may be reacted with chlorosulfonyl isocyanate followed by reaction with an amine and then the resulting adduct attached via hydrosilation to a SiH containing silicone or hydrolyzable silane. An alternative of this synthesis would be to attach the propargyl alcohol to the silicone first and then react the hydroxy functionality with chlorosulfonyl isocyanate and then an amine to give a siloxane bound anaerobic accelerator. Other alcohols with aliphatic or alicyclic unsaturation, such as those described above, may similarly be used in place of propargyl alcohol.

As an alternative to hydrosilation, accelerators of the invention may be bound to silicones by reaction of chlorosulfonyl isocyanate with silanes having hydrolyzable functionality and, after completion of the adduct formation, incorporation of the silane into a polyorganosiloxane polymer by condensation polymerization or equilibration. Such accelerators may, for instance, be the reaction product of chlorosulfonyl isocyanate, first with a suitable alcohol such as benzoin or hydroxyethyl methacrylate followed by reaction with 3-aminopropyltrimethoxysilane.

The reaction conditions and versatility of the anaerobic accelerator compounds and compositions enabled by the present invention are illustrated by the following non-limiting examples.

EXAMPLES 1–5

To a solution in methylene chloride of hydroxy functional compound as listed in Table 1 (typical conc. about 0.33M) cooled under Argon to about −10° C. was added dropwise an equivalent amount of chlorosulfonyl isocyanate (based on isocyanate functionality) taking care to keep the temperature below 0° C. The solution was then stirred for 1.5 hours while allowing the temperature to warm to room temperature. A mixture of an equivalent amount (based on Cl functionality) of the amino functional compound listed in Table 1 and excess triethylamine were then added dropwise to the reaction mixture and stirring continued for 1 hour. The triethylamine hydrochloride salt was then filtered off and the solvent evaporated using a rotary evaporator. NMR spectra of the resulting products were consistent with the expected sulfonyl urethane adducts.

TABLE 1

| Example | Hydroxy functional Compound | Amine functional Compound |
|---|---|---|
| 1 | benzoin | 3-aminopropyltrimethoxysilane |
| 2 | propargyl alcohol | N—methylaniline |
| 3 | polydimethylsiloxane terminated with dimethyl(3-hydroxypropenyl) siloxy groups | t-butylaminoethyl methacrylate |
| 4 | hydroxyethyl methacrylate | N—methyl aniline |
| 5 | 3,3-dimethyl-propyn-3-ol | t-butylaminoethyl methacrylate |

EXAMPLE 6

The adduct of N-methyl aniline and chlorosulfonyl isocyanate having the formula:

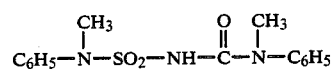

was prepared as in Examples 1–5 except that 3 equivalents (based on isocyanate) of N-methyl aniline were substituted for the single equivalent of alcohol and the addition of mixed amines after warming to room temperature was omitted.

EXAMPLE 7

A formulation containing 3% of the product of Example 1 and 97% polyethylene glycol dimethacrylate as a thin film was irradiated with UV light of 20,000 microwatts/cm$^2$ the film polymerized to a solid in 20 seconds.

When 2% cumene hydroperoxide and 1% dimethyl-p-toluidine were added to the above formulation, anaerobic curing was observed overnight between steel nuts and bolts was observed.

EXAMPLE 8

Formulations containing the chlorosulfonyl isocyanate adducts as listed in Table 2, 2% cumene hydroperoxide, 1% amine solution (N,N-diethyl-p-toluidine and N,N-dimethyl-p-toluidine, 2:1 by weight), 200 ppm napthoquinone, and 0.09% EDTA and the balance polyethylene glycol dimethacrylate were prepared, applied between steel nuts and bolts and allowed to cure anaerobically overnight. Break and prevail strengths were determined and are also listed in Table II.

TABLE II

| Adduct of Example | Amount | Break/Prevail (in lbs.) |
|---|---|---|
| 2 | 2.5% | 60/160 |
| 4 | 2% | 55/185 |
| 5 | 5% | 47/165 |
| 6 | 4.5% | 240/280 |

By contrast, a control formulation in which the accelerator adduct was omitted gave Break/Prevail values of 0/0 in lbs.

We claim:

1. A free radical curable composition comprising an acrylate or methacrylate compound; an accelerator compound of the formula:

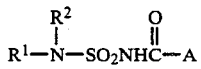

where A is $OR^3$, $OOR^3$, or $NR^1R^2$; $R^1$ is H or an organo group, and $R^2$ and $R^3$ are the same or different organo groups; and a compound, which may be the same as or different from the accelerator compound, which is a source of free radicals for cure initiation.

2. A composition as in claim 1 wherein A is $OR^3$.

3. A composition as in claim 2 wherein $R^3$ comprises an acrylate or methacrylate functional group.

4. A composition as in claim 2 wherein $R^3$ comprises a functional group with photoinitiating activity.

5. A composition as in claim 4 wherein said photoinitiating functional group comprises said free radical source.

6. A composition as in claim 2 where $R^3$ comprises a polyorganosiloxane backbone.

7. A composition as in claim 2 wherein $R^3$ is an olefinically or acetylenically unsaturated hydrocarbyl group.

8. A composition as in claim 1 wherein A is $OOR^3$ and said accelerator compound also comprises said free radical source.

9. A composition as in claim 8 wherein $R^3$ is cumyl or t-butyl.

10. A composition as in claim 1 wherein $R^1$ is H or hydrocarbyl and $R^2$ comprises an acrylate or methacrylate functional group.

11. A composition as in claim 1 wherein $R^1$ is H or alkyl and $R^2$ is aromatic.

12. A composition as in claim 1 wherein the said accelerator compound is the reaction product of a sequential reaction of chlorosulfonyl isocyanate, first reacting the isocyanate group with an equivalent amount of a hydroxyl containing compound and subsequently reacting the sulfonyl chloride group with an equivalent amount of a primary or secondary amine.

13. A composition as in claim 12 wherein said hydroxyl containing compound is selected from the group consisting of photoinitiators with hydroxyl groups, polymers with alkyl hydroxy groups, hydroxyl alkyl acrylate or methacrylate esters, hydroxy alkyl silanes and alcohols with aliphatic or alicyclic unsaturation.

14. A composition as in claim 12 wherein said hydroxyl containing compound is a hydroperoxide.

15. A composition as in claim 12 wherein said primary or secondary amine is selected from the group consisting of primary or secondary aromatic amines, amines with long chain aliphatic hydrocarbon groups, and polymers with amine groups.

16. A composition as in claim 1 wherein said free radical source comprises a hydroperoxide compound.

17. An anaerobic composition as in claim 1.

18. A composition as in claim 13 wherein the hydroxy containing compound is selected from the group consisting of benzoin, 1-benzoylcyclohexanol, 1-(4-dodecylphenyl)-2-methylpropan-1-one and α-hydroxyisobutyrophenone.

19. A composition as in claim 13 wherein said hydroxy containing compound is a silicone with alkyl hydroxy functionality.

20. A composition as in claim 15 wherein said primary or secondary amino functional compound is t-butylaminoethyl methacrylate.

21. A compound as in claim 1 where the source of free radicals is a compound with a peroxy functional group or a functional group with photoinitiating activity.

* * * * *